(12) United States Patent
Chinnici et al.

(10) Patent No.: US 8,972,825 B2
(45) Date of Patent: Mar. 3, 2015

(54) CHANNEL ESTIMATION IN ADAPTIVE MODULATION SYSTEMS

(75) Inventors: Stefano Chinnici, Milan (IT); Maurizio Moretto, Mediglia (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 399 days.

(21) Appl. No.: 13/260,614

(22) PCT Filed: Mar. 30, 2009

(86) PCT No.: PCT/EP2009/053757
§ 371 (c)(1),
(2), (4) Date: Nov. 17, 2011

(87) PCT Pub. No.: WO2010/112063
PCT Pub. Date: Oct. 7, 2010

(65) Prior Publication Data
US 2012/0072802 A1    Mar. 22, 2012

(51) Int. Cl.
*H03M 13/00* (2006.01)
*H04L 1/00* (2006.01)
*H04L 1/20* (2006.01)

(52) U.S. Cl.
CPC ............. *H04L 1/0003* (2013.01); *H04L 1/20* (2013.01); *Y02B 60/31* (2013.01)
USPC ........................................................ 714/774

(58) Field of Classification Search
CPC ... H04L 1/0009; H04L 1/0057; H04L 1/0041; H04L 1/0071; H04L 1/0003; H04L 1/0026; H04L 1/1819; H04L 1/0068; H03M 13/35; H03M 13/2957; H04B 7/0417; G10L 19/0204
See application file for complete search history.

(56) References Cited

U.S. PATENT DOCUMENTS

| 6,044,485 | A  | * | 3/2000  | Dent et al. ............... | 714/774 |
|-----------|----|---|---------|-----------------------------|---------|
| 6,330,278 | B1 | * | 12/2001 | Masters et al. ........... | 375/223 |
| 6,452,964 | B1 | * | 9/2002  | Yoshida ..................... | 375/222 |
| 6,826,157 | B1 | * | 11/2004 | Davis et al. ............... | 370/252 |
| 8,255,763 | B1 | * | 8/2012  | Yang et al. ................ | 714/755 |

(Continued)

FOREIGN PATENT DOCUMENTS

EP    1416661 A2    5/2004
WO    2006055718 A2    5/2006

OTHER PUBLICATIONS

Smolnikar, et al., "Target BER Driven Adaptive Coding and Modulation in HAP based DVB-S2 System", Advanced Satellite Mobile Systems, Aug. 26, 2008, pp. 262-267, XP031317939.

*Primary Examiner* — Albert Decady
*Assistant Examiner* — Enamul M Kabir
(74) *Attorney, Agent, or Firm* — Rothwell, Figg, Ernst & Manbeck, P.C.

(57) ABSTRACT

A device (20) for an adaptive modulation communication system is provided. The device (20) comprises an input device (21) adapted to receive, from a communication channel, data encoded through a FEC code. A FEC decoder (23) connected downstream of the input device (21) is also provided for FEC decoding the received encoded data and providing error information determined by the FEC decoding. The device according to the invention further comprises means for measuring first error information of the encoded data before FEC decoding the received encoded data, and means for measuring second error information determined by the FEC decoder (23). Means (25) for estimating a condition of the communication channel based on both the first error information and the second error information are also provided.

34 Claims, 5 Drawing Sheets

(56) References Cited

U.S. PATENT DOCUMENTS

2005/0031044 A1* 2/2005 Gesbert et al. ............... 375/259
2008/0008257 A1* 1/2008 Yonesi et al. ................. 375/262
2008/0259901 A1* 10/2008 Friedman et al. ............. 370/349
2009/0060094 A1* 3/2009 Jung et al. .................... 375/340

* cited by examiner

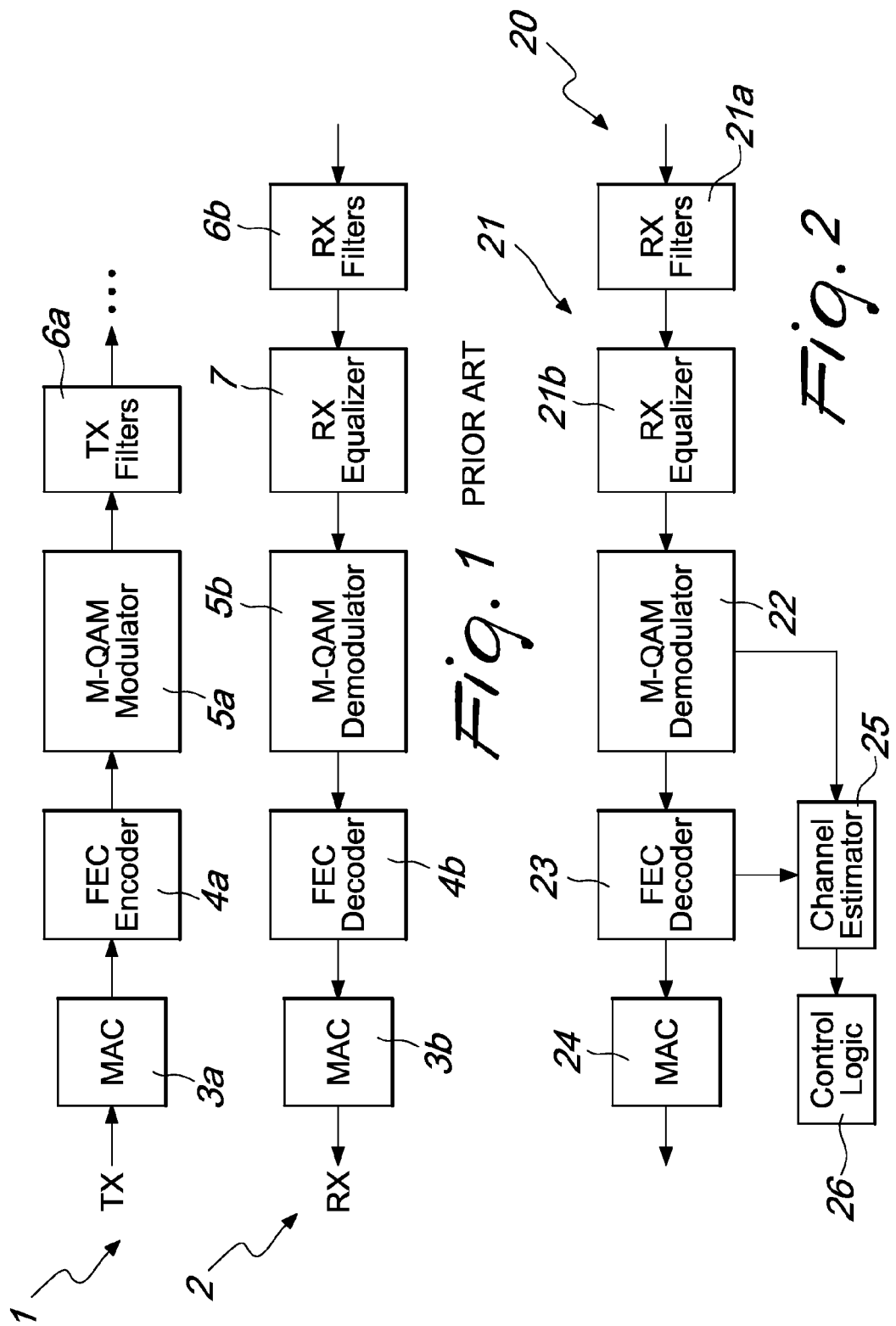

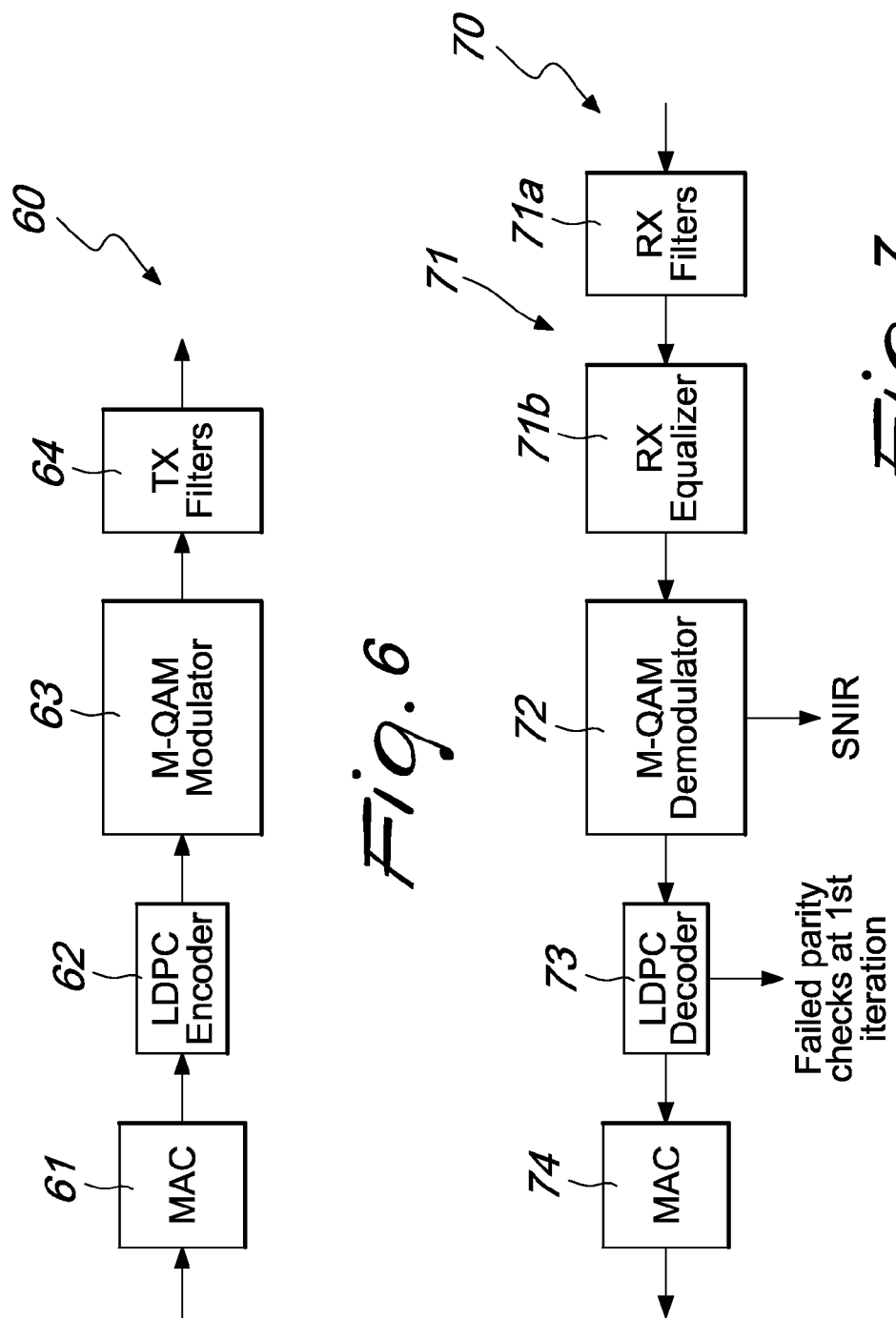

CHANNEL ESTIMATION IN ADAPTIVE MODULATION SYSTEMS

CROSS REFERENCE TO RELATED APPLICATION(S)

This application is a 35 U.S.C. §371 National Phase Entry Application from PCT/EP2009/053757, filed Mar. 30, 2009, designating the United States, the disclosure of which is incorporated herein in its entirety by reference.

TECHNICAL FIELD

The present invention relates to channel estimation in adaptive modulation systems. More particularly, the invention is adapted to wireless communication systems where modulation and channel coding are used by transmitters to improve the quality of the wireless link.

BACKGROUND

Adaptive modulation is a technique used to maximize the capacity of a communication system without affecting its availability. In its most general form a communication system employing adaptive modulation uses a channel estimate derived at the receiver to control transmission parameters such as modulation order and Forward Error Correction (FEC) overhead, with the objective of maximizing traffic capacity.

An adaptive modulation system is depicted in FIG. 1 and includes a transmitter side 1 and a receiver side 2. The transmitter side 1 comprises a Media Access Controller 3a (MAC) for receiving raw data bits from a source of information and scheduling the bits for transmission, with a data rate which is increased or decreased depending on the selected modulation level M. A FEC encoder 4a encodes the bits from the MAC 3, wherein the encoding operation may include scrambling, interleaving, outer and inner code encoding based at block level, or other conventional encoding methods.

An M-point Quadrature Amplitude Modulation (M-QAM) modulator 5a is then provided for mapping the encoded bitstream from the FEC encoder 4a, according to the modulation mode in use, which is based on the number M of points defining the QAM constellation. Before radio transmission, a TX filter section 6a is used for processing and preparing for radio transmission the symbols from the M-QAM modulator 5a.

The receiver side 2 of the system includes an RX filter section 6b, for performing a first filtering operation on the received radio signal, and an adaptive equalizer section 7 which restores the signal quality by removing the residual inter-symbol interference, for example, by employing both the Constant Modulus (CM) and the Decision Directed (DD) update methods. A soft-decision M-QAM demodulator 5b is also provided in the receiver side 2 for demapping the received symbols and, downstream of the demodulator, a FEC decoder 4b applies FEC error correction to the demapped bitstream from the demodulator 5b using soft information. Finally, a second MAC 3b repacks the variable rate data stream.

The transmitter side 1 has the capability to switch the modulation level M upon receiving a command from the receiver side 2, based on the detected radio propagation conditions. For instance, if the weather conditions in the radio channel worsen, e.g., from sunny to heavy rainy, the QAM modulation level M may be changed from 256-QAM to 64-QAM, because of the capacity drop of the channel.

Systems are known where different types of information available before both symbol demapping and FEC decoding are used as channel estimator. Particularly, it is known to use the Mean Square Error (MSE) level of the signal measured at the receiver as an estimator of the Signal to Noise Ratio (SNR) or the Signal to Noise and Interference Ratio (SNIR). Normally, the MSE is measured and averaged over a time frame of the received radio communication signal, which may cover from 500 microseconds to 3 milliseconds depending on the specific application. The averaged MSE is then compared with thresholds corresponding to the modulation or physical layer (PHY) modes shift levels. In order to avoid bit errors during the shift, an additional margin on the shift levels is added, the margin being computed taking into account a reference SNIR level at a Bit Error Rate (BER) of $10^{-6}$.

WO 00/76109, instead, discloses a method which considers both signal strength and the BER at the receiver, after error corrections, for determining the modulation mode.

In WO 99/12302, BER is disclosed as one of the possible means for indicating the quality level.

A drawback affecting the known systems is that a relatively long time period, such as an entire radio frame, is needed to get a reliable estimator of the SNIR.

Moreover, the behaviour of the BER of the uncoded signal and the FEC coding gain curve shape are not tracked, because the use of receiver information before symbol demapping takes into account only modulation information available at the receiver.

Another drawback is that when BER is considered for adaptive modulation purposes, it is the BER available after errors have been corrected, e.g. the BER measured downstream of a FEC decoder, and this implies a very slow reaction to fast variations in the radio channels.

SUMMARY

It is an object of the invention to obviate at least some of the above drawbacks and provide a method and devices particularly suitable for adaptive modulation systems.

This object and other objects which will become better apparent hereinafter are solved by a method for an adaptive modulation communication system, wherein data encoded through a Forward Error Correction (FEC) code is received over a communication channel. Then, a first error information of the encoded data available before FEC decoding the received encoded data is measured. Second error information made available by the FEC decoding of the encoded data is also measured. Finally, transmission over the communication channel is controlled based on both the first error information and the second error information.

Preferably, the FEC decoding of the encoded data comprises demodulating a modulated data signal received over the communication channel and subsequently applying the Forward Error Correction to the demodulated data signal.

The modulated data signal may be a Quadrature Amplitude Modulation (QAM) data signal and the above demodulating step may comprise a QAM demapping of symbols contained in the modulated data signal.

The first error information is preferably a Mean Squared Error (MSE) level of the received encoded data, more preferably an estimate of a signal-to-noise plus interference ratio (SNIR) of the encoded data before the demodulating step.

The second error information, instead, may comprise a temporal average of a number of errors detected during the FEC decoding. Such temporal average may be advantageously calculated over an integration time which is less than the duration of a radio frame in the communication channel.

The first error information may be used for detecting variations of the communication channel condition faster than a predefined rate. Also in this case, the first error information may be compared with thresholds corresponding to modulation shift levels.

In order to control transmission, a weighted combination of the first and the second error information is preferably provided for determining a transmission mode over the communication channel. The weights of the combination may depend on a rate of variation of the communication channel condition.

The FEC decoding step may include Single Parity Check (SPC) decoding and Reed-Solomon (RS) decoding. In this case, the second error information may be the number of block errors detected by the SPC decoding.

As a possible alternative, the FEC decoding step may include Low Density Parity Check (LDPC) iterative decoding. In this case, the second error information may be the number of failed parity checks at the first decoding iteration or the number of failed parity checks at a decoding iteration different from the first iteration.

A device for an adaptive modulation communication system is also provided according to the invention. The device comprises an input device adapted to receive, from a communication channel, data encoded through a FEC code. A FEC decoder connected downstream of the input device is also provided for FEC decoding the received encoded data and providing error information determined by the FEC decoding. The device according to the invention also comprises means for measuring first error information of the encoded data before FEC decoding the received encoded data and means for measuring second error information determined by the FEC decoder. Means for estimating a condition of the communication channel based on both the first error information and the second error information are also provided.

The device according to a preferred embodiment of the invention comprises a demodulator connected between the input device and the FEC decoder. In this case, the means for measuring the first error information are adapted to measure the first error information of the encoded data between the demodulator and the input device. The demodulator may be a QAM demodulator.

In the device for an adaptive modulation communication system the first error information may be a Mean Squared Error level of the received encoded data. More particularly, the first error information may be an estimate of a signal-to-noise plus interference ratio of the encoded data upstream of the demodulator.

The second error information may comprise a temporal average of a number of errors detected by the FEC decoder during the FEC decoding. Such temporal average is preferably calculated over an integration time which is less than the duration of a radio frame in the communication channel.

The means for estimating the communication channel condition are preferably adapted to give a greater weight to the first error information than to the second error information in case of variations of the communication channel condition faster than a predefined rate.

Moreover, the means for estimating the communication channel condition may be adapted to compare the first error information with thresholds corresponding to modulation shift levels.

Advantageously, the means for estimating the communication channel condition are adapted to provide a weighted combination of the first and the second error information for determining a transmission mode over the communication channel: in this case, the weights of the combination depend on a rate of variation of the communication channel condition.

The FEC decoder may includes a Single Parity Check decoder and Reed-Solomon decoder: in this case, the second error information is or includes the number of block errors detected by the Single Parity Check decoder.

As an alternative, the FEC decoder may include a Low Density Parity Check iterative decoder: in this case, the second error information is the number of failed parity checks at the first decoding iteration, or the number of failed parity checks at a decoding iteration different from the first decoding iteration.

In accordance with the invention, an adaptive modulation communication system is also provided and comprises a transmitter stage for transmitting over a communication channel data encoded through a Forward Error Correction code, with the encoded data modulated according to the communication channel conditions. The system comprises a receiver stage, which includes an input device adapted to receive, from the communication channel, the encoded data and a FEC decoder connected downstream of the input device, for FEC decoding the received encoded data and providing error information determined by the FEC decoding. The receiver stage also comprises means for measuring first error information of the encoded data before FEC decoding the received encoded data and means for measuring second error information determined by the FEC decoder. The receiver stage further includes or is connected to means for estimating a condition of the communication channel based on both the first error information and the second error information.

The receiver stage preferably comprises a demodulator connected between the input device and the FEC decoder: in this case, the means for measuring the first error information are adapted to measure the first error information of the encoded data between the demodulator and the input device.

The demodulator may advantageously be a Quadrature Amplitude Modulation demodulator.

As regards the first error information, it may be a Mean Squared Error level of the received encoded data, such as an estimate of a signal-to-noise plus interference ratio of the encoded data upstream of the demodulator.

The second error information may comprise a temporal average of a number of errors detected by the FEC decoder during the FEC decoding. Such temporal average may be calculated over an integration time which is less than the duration of a radio frame in the communication channel.

The means for estimating the communication channel condition are preferably adapted to give a greater weight to the first error information than to the second error information in case of variations of the communication channel condition faster than a predefined rate.

Moreover, the means for estimating the communication channel condition may be adapted to compare the first error information with thresholds corresponding to modulation shift levels.

A weighted combination of the first and the second error information may be provided by the means for estimating the communication channel condition for determining a transmission mode over the communication channel: in this case, the weights of the combination may depend on a rate of variation of the communication channel condition.

In particular embodiments, the FEC decoder includes a Single Parity Check decoder and Reed-Solomon decoder. The second error information may the number of block errors detected by the Single Parity Check decoder.

In other embodiments, the FEC decoder includes a Low Density Parity Check iterative decoder, and the second error information is the number of failed parity checks at the first decoding iteration or the number of failed parity checks at a decoding iteration different from the first decoding iteration.

With the method, system and device according to the invention it is possible to give the adaptive modulation system a quick response to sudden weather changes, because detection occurs a number of functional blocks before the last MAC block of the receiver, where the final BER is, instead, measured according to the prior art.

First error information such as the SNIR can be compared with thresholds corresponding to the prior art modulation shift levels, but without taking into account the additional shift margin of the prior art. This is because the first error information is measured before symbol decision from the FEC decoder.

Moreover, the combination of error information before and after symbol demapping can be performed regardless of the type of FEC being applied.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein:

FIG. 1 is an adaptive modulation system according to the prior art;

FIG. 2 is a receiver for an adaptive modulation system according to the invention;

FIG. 6 is a transmitter of an adaptive modulation system according to a second preferred embodiment of the invention;

FIG. 7 is a corresponding receiver for the transmitter of FIG. 6;

DETAILED DESCRIPTION

Figure 3:
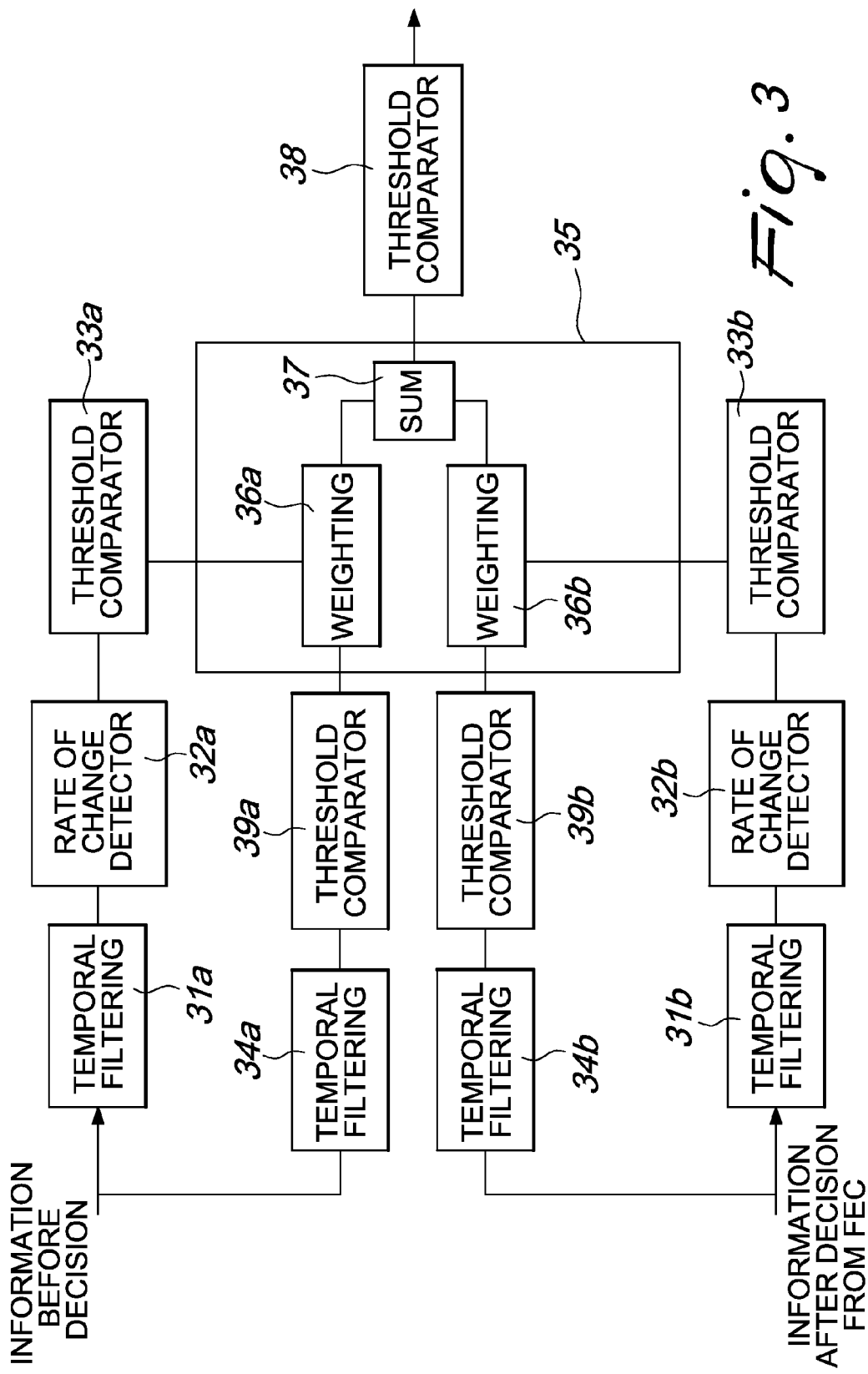
FIG. 3 is a channel estimation means suitable for the receiver of FIG. 2.

A receiver device 20 according to preferred embodiments of the invention is shown in FIG. 2. The device comprises an input device 21 adapted to receive, from a communication channel, such as a radio channel subject to changes in weather conditions, data encoded through a FEC code. Such data may have been generated by a transmitter such as transmitter 1 of FIG. 1.

The input device 21 may include, as in the prior art, an RX filter section 21a, for performing a first filtering operation on the radio signal received from the radio channel and carrying the encoded data. Moreover, the input device 21 may also comprise an adaptive equalizer section 21b, which is adapted to restore the signal quality by removing the residual inter-symbol interference: to this aim, both the Constant Modulus (CM) and the Decision Directed (DD) update methods may be employed.

A FEC decoder 23 is connected downstream of the input device 21 and is adapted to decode the received encoded data according to a Forward Error Correction method and to provide error information determined by or during the FEC decoding operation.

The device according to the invention also comprises means for measuring first error information of the encoded data before FEC decoding the received encoded data and means for measuring second error information determined by the FEC decoder. Such means may be provided by a single device connected to the receiver device 20 both upstream of the FEC decoder 23 and downstream of the FEC decoder, so as to retrieve both first and second error information. Separate devices adapted to exchange both error information may be provided in the alternative, as will be described with reference to FIG. 3.

Means 25 for estimating and communicating to the remote transmitter 1 the condition of the communication channel based on both the first error information and the second error information are also provided, either at the receiver 20 itself or in communication with it. Such means 25 are preferably coupled with suitable control logic 26 which is adapted to retrieve a decision from the channel estimator 25 and send it to the transmitter 1 in any known way used in known adaptive modulation systems for communicating channel conditions or modulation level changes from receivers to transmitters.

Preferably, the receiver device 20 comprises an M-QAM demodulator 22 connected between the input device 21 and the FEC decoder 23, for demapping the received encoded data and provide the FEC decoder with a corresponding encoded bitstream. In this case, the first error information is the error information of the encoded data available between the M-QAM demodulator 22 and the input device 21, which is also herein indicated as "error information before decision" or "error information before symbol demapping".

More specifically, the first error information may be a Mean Squared Error (MSE) level of the symbols received by the M-QAM demodulator 22, such as an estimate of a Signal-to-Noise plus Interference Ratio (SNIR) of the encoded data available upstream of the demodulator 22. The first error information may additionally or alternatively include the estimated level of inter-symbol interference from the RX equalizer section 21h.

The second error information, which will be also herein referred to as "error information after decision", may comprise a temporal average of a number of errors detected by the FEC decoder 23 during the FEC decoding operation. Such temporal average is calculated over an integration time which is less than the duration of a radio frame in the communication channel, e.g. half of it, as it will be better explained hereinafter.

The means 25 for estimating and communicating the communication channel condition are depicted with more detail in FIG. 3.

Such means 25 are preferably based on a cascade of separate temporal filters on the error information available before and after decision from the FEC decoder and a weighting and combining logic.

The temporal filtering block includes, in each branch, first and second averaging filters 34a and 34b with selectable temporal window and first and second rate-of-change detectors 32a and 32b of the first and second error information, respectively.

The averaging filters 34a and 34b are adapted to obtain a smoothed value of the first and second error information, respectively, with a time window which is adjusted according to the characteristics of the incoming error information.

The rate of change detectors 32a and 32b are adapted to detect and track the time variant propagation conditions and can be respectively preceded by time filters 31*a* and 31*b* for determining an average value of the incoming error information in different, and in general shorter, time window with respect to the time window applied by the respective filters 34*a* and 34*h*. As an alternative, the rate of change detectors 32*a* and 32*b* can directly receive the error information, without any upstream time filters 31*a* and 31*b*.

A weighting and combining logic 35 is adapted to receive from the previous blocks the average value of both the first and second error information and the rate of change of both the first and second error information, after they have been compared with respective pre-defined thresholds at separate threshold comparators 33*a*/39*a* and 33*b*/39*b*.

Specifically, first and second rate-of-change threshold comparators 33*a* and 33*b* are suitable to receive rate of change of the first and second error information from detectors 32*a* and 32*b*, respectively, and compare it with a plurality of rate of change thresholds. First and second average threshold comparators 39*a* and 39*h* are, instead, suitable to respectively receive the time averaged first and second error information from filters 34*a* and 34*b* and to compare it with pre-defined average error thresholds.

The logic 35 further comprises weighting means 36*a* and 36*b* which are adapted to use the outcome of the comparisons at blocks 33*a*, 39*a*, 33*b* and 39*b* to set a separate weight on the average quantities.

Adder means 37 are finally included in the logic 35 to sum these weighted quantities together to get a final estimator function value, which is then fed to a threshold comparator 38 in order to be compared with a predetermined set of estimator thresholds, such as modulation shift levels.

Figure 4:
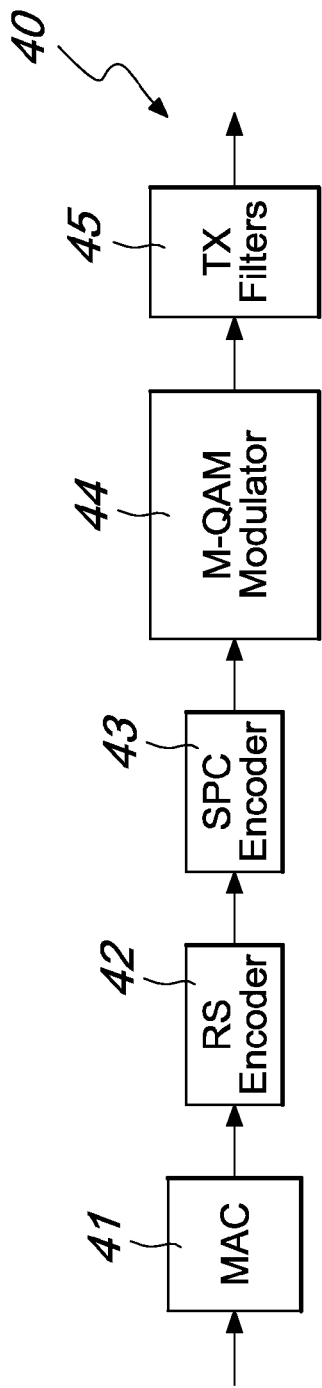
FIG. 4 is a transmitter of an adaptive modulation system according to a first preferred embodiment of the invention.
Figure 5:
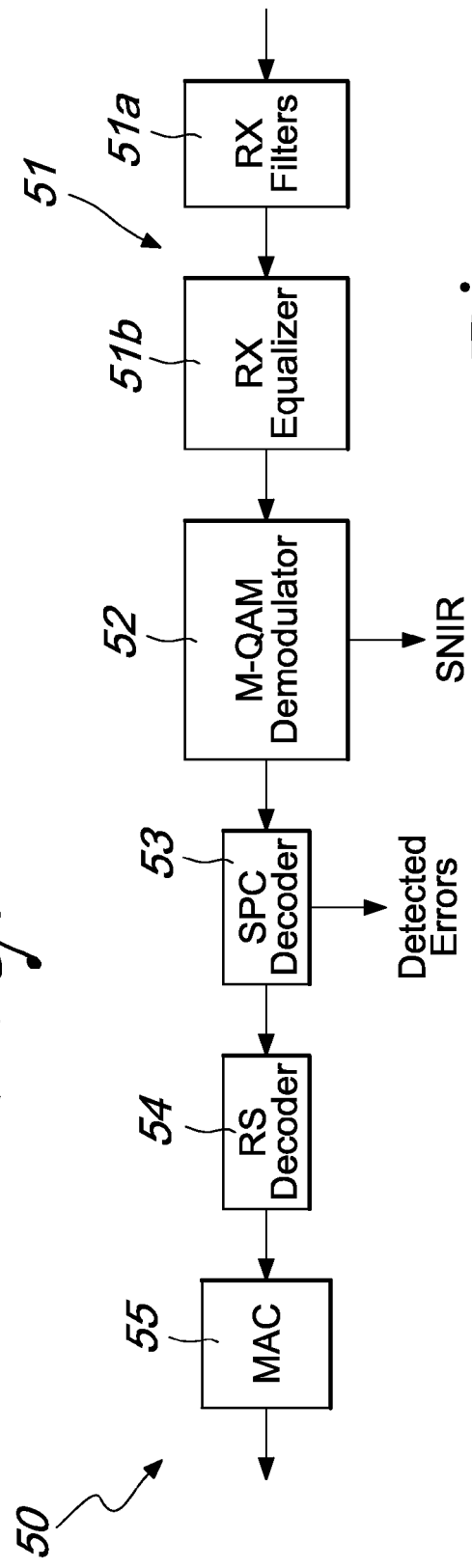
FIG. 5 is a corresponding receiver for the transmitter of FIG. 4.

An adaptive modulation system according to a first preferred embodiment of the invention is shown in FIGS. 4 and 5. The transmission side 40 of the system includes a MAC controller 41 and a FEC encoder based on a concatenated scheme, comprising a Reed-Solomon (RS) outer code and a Single Parity Check (SPC) inner code. To this aim, the FEC encoder includes an RS encoder 42 and an SPC encoder 43, which are provided upstream of conventional M-QAM modulator 44 and TX filter 45 as described above with reference to FIG. 1.

The receiver side 50 of the system according to the first preferred embodiment comprises an input device 51 corresponding to device 21 described above, i.e. comprising RX filters 51*a* and an RX equalizer 51*b* according to the prior art.

The FEC decoder includes an SPC decoder 53 and an RS decoder 54, provided downstream of the M-QAM demodulator 52, which corresponds to the M-QAM demodulator 22 described above.

The second error information is or includes the number of block errors detected by the SPC decoder, while the first error information is the SNIR available upstream of the demodulator 52. The first error information may additionally or alternatively include the estimated level of inter-symbol interference from the RX equalizer section 51*b*.

An adaptive modulation system according to a second preferred embodiment of the invention is shown in FIGS. 6 and 7. The transmission side 60 of the system includes a MAC controller 61 and a Low Density Parity Check (LDPC) encoder 62, which is provided upstream of a conventional M-QAM modulator 63 and TX filter 64 as described above with reference to FIG. 1.

The LDPC code is a block code which is decoded in an iterative way, refining the estimate of the values of the input bits for a predetermined maximum number of iterations until all parity checks are satisfied or the maximum number of iterations has been reached. As an example, the maximum number of iterations is fixed to 20.

The receiver side 70 of the system according to the first preferred embodiment comprises an input device 71 corresponding to device 21 described above, i.e. comprising RX filters 71*a* and an RX equalizer 71*b* according to the prior art.

The FEC decoder is an LDPC decoder 73, followed by a conventional MAC 74. In this embodiment, the second error information is the number of failed parity checks at the first decoding iteration, or the number of failed parity checks at a decoding iteration different from the first decoding iteration. Such two kinds of error information will be dealt with separately hereinafter.

Figure 8:
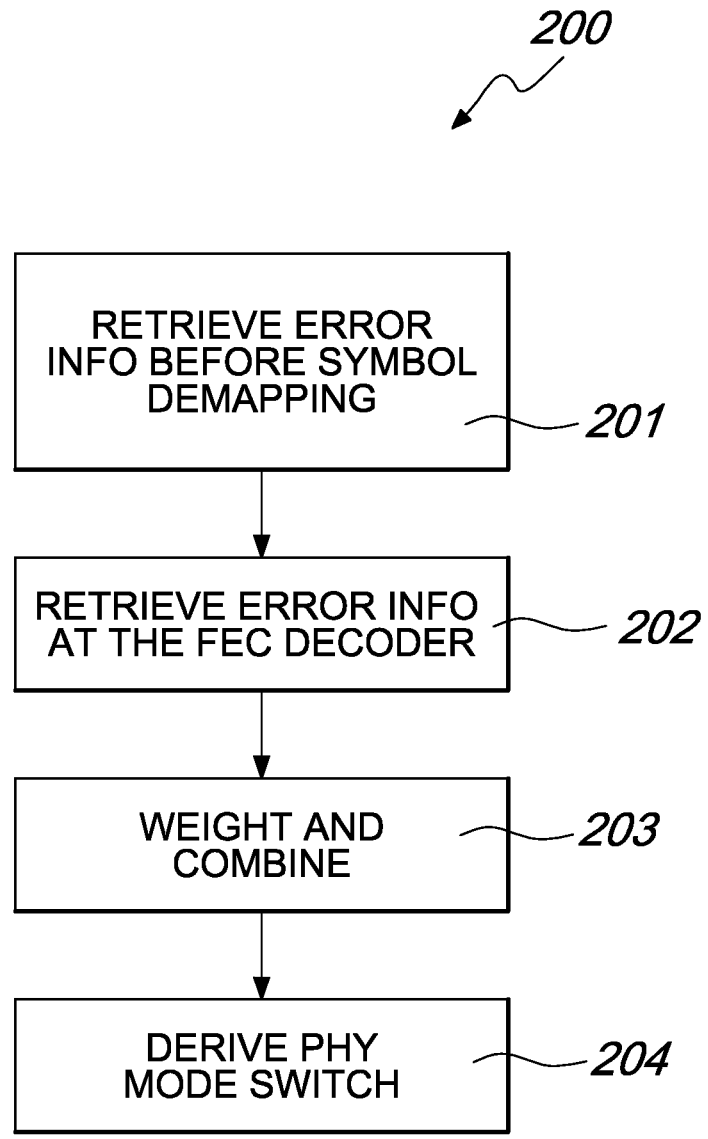
FIG. 8 is a channel estimation method according to the invention.

Based on the above description, it can be noted that the operation (200) of the invention is substantially as follows (FIG. 8). After having received, over the radio communication channel, data encoded through a Forward Error Correction, FEC, code, in step 201 first error information of the encoded data available before FEC decoding the received encoded data is measured. Then, in step 202 second error information made available by FEC decoder is also measured. Finally, transmission over the communication channel is controlled in step 204, based on both the first error information and the second error information.

The combination of the first error information and the second error combination used in step 204 for estimating the channel conditions and consequently causing the most appropriate transmission modulation be chosen is a weighted combination, where weights can be varied even to zero, depending on the rate of change of the channel conditions determined by the first error information.

The operation of the first preferred embodiment of the invention, shown in FIGS. 4 and 5, may be as follows.

The SNIR value is integrated over one radio frame by time filter 34*a* and its rate of change detected at block 32*a* is compared against a set of two thresholds at block 33*a*: the highest threshold is considered as the fast reaction threshold and the lowest threshold is considered as the standard threshold.

The number of errors detected by the SPC decoder 53 is integrated at the temporal filter 34*b* over a period of half the radio frame.

The weights at the logic 35 are assumed to be decimal fractions represented with at most 2 bits and can be set as follows.

If the SNIR is decreasing and its rate of change exceeds the fast reaction threshold, the weight of the SNIR value at block 36*a* is set to 1 and the weight of the detected errors from decoder 53 is set to 0 at block 36*b*, so that the switch mode indication is reacting to the fast rate of change of the channel propagation conditions.

If the SNIR is decreasing and its rate of change is below the fast reaction threshold, the weight of the SNIR value at block 36*a* is set to 0.5 and the weight of the detected errors from decoder 53 is set to 0.5 at block 36*b*, so that both indications are given equal weight in the final PHY mode switch decision.

If the SNIR rate of change is below the standard threshold, the weight of the SNIR value is set to 0 at block 36*a* and the weight of the detected errors from decoder 53 is set to 1 at block 36*b*, so that the final PHY mode switch decision is dependent on the most accurate detected error information.

As an alternative, the rate of change of the number of errors at SPC decoder 53 may be also considered by the logic 35. In particular, the SNIR value is integrated over one radio frame by filter 34*a* and its rate of change is compared against the two thresholds in block 33*a* as before.

The number of detected errors from SPC decoder 53 is integrated over a period of half the radio frame in block 34b and its rate of change detected at detector 32b is compared at block 33b against a set of two thresholds, the highest one being the fast reaction threshold. The weights are assumed to be decimal fractions represented with at most two bits.

The weights in the combining logic are set as follows.

If the SNIR, is decreasing and both the SNIR rate of change and the detected errors rate of change exceed the respective fast reaction thresholds, the weight of the SNIR value is set to 0.75 and the weight of the detected errors is set to 0.25, so that priority is given to the fastest information of the channel propagation conditions.

If the SNIR is decreasing and its rate of change is below the fast reaction threshold and the detected errors rate of change exceeds the fast reaction threshold, the weight of the SNIR value is set to 0 and the weight of the detected errors average is set to 1, so that the final PHY mode switch decision is taken based on the most reliable detected errors information.

Regardless of the direction of change of the SNIR, if both the SNIR rate of change and the detected errors rate of change are between the standard and fast reaction thresholds, the weight of the SNIR is set to 0.25 and the weight of the detected errors average is set to 0.75, so that the most reliable information has more weight in the final PHY mode decision.

Regardless of the direction of change of the SNIR, if the SNIR rate of change is below the standard threshold, the weight of the SNIR is set to 0 and the weight of the detected errors average is set to 1, so that the most reliable information is used in the final PHY mode decision.

The operation of the second preferred embodiment depicted in FIGS. 6 and 7 may be as follows.

As in the first embodiment, the SNIR value is integrated over one radio frame at filter 34a and its rate of change is compared at comparator 33a against a set of two thresholds, the highest one being the fast reaction threshold.

The number of failed parity checks computed at the first iteration of the LDPC decoder 73 is averaged over a number of LDPC blocks corresponding to a period of half the radio frame (in the following description named FEC indicator). The weights are assumed to be decimal fractions represented with at most 2 bits.

The weights in the combining logic 25 are set as follows.

If the SNIR is decreasing and its rate of change exceeds the fast reaction threshold, the weight of the SNIR value at block 36a is set to 1 and the weight of FEC indicator is set to 0 at block 36b, so that the switch mode indication is reacting to the fast rate of change of the channel propagation conditions.

If the SNIR is decreasing and its rate of change is below the fast reaction threshold and the FEC indicator rate of change exceeds the fast reaction threshold, the weight of the averaged SNIR value at block 36a is set to 0 and the weight of the detected errors average is set to 1 at block 36h, so that the final PHY mode switch decision is taken based on the most reliable detected errors information.

Regardless of the direction of change of the SNIR, if both the SNIR rate of change and the FEC indicator rate of change are between the standard and fast reaction thresholds, the weight of the SNIR is set to 0.25 at block 36a and the weight of the detected errors average is set to 0.75 at block 36b, so that the most reliable information has more weight in the final PHY mode decision.

Regardless of the direction of change of the SNIR, if the SNIR rate of change is below the standard threshold, the weight of the SNIR is set to 0 and the weight of the FEC indicator is set to 1, so that the most reliable information is used in the final PHY mode decision.

If the error information is the number of failed parity checks at an iteration different from the first, e.g. at the fourth iteration, the following is provided.

The SNIR value is integrated over one radio frame in block 34a, and its rate of change from block 32a is compared against the set of two thresholds as before, in block 33a.

The number of failed parity checks computed at the fourth iteration of the LDPC decoder 73 is averaged over a number of LDPC blocks corresponding to a period of half the radio frame (in the following description named "FEC indicator"), and its rate of change from detector 32b is compared at block 33b against a set of two thresholds, the highest one being the fast reaction threshold. The weights are assumed to be decimal fractions represented with at most 2 bits.

In this case, the weights in the combining logic 35 are set as follows.

If the SNIR is decreasing and both the SNIR rate of change and the FEC indicator rate of change exceed the fast reaction thresholds, the weight of the SNIR value is set to 0.50 at block 36a and the weight of the detected errors is set to 0.50 at block 36b, to give weight both to the fast reaction information and to the most reliable information.

If the SNIR is decreasing and its rate of change is below the fast reaction threshold and the FEC indicator rate of change exceeds the fast reaction threshold, the weight of the SNIR value is set to 0 at block 36a and the weight of the FEC indicator is set to 1 at block 36b, so that the final PHY mode switch decision is taken based on the most reliable information.

Regardless of the direction of change of the SNIR, if both the SNIR rate of change and the FEC indicator rate of change are between the standard and fast reaction thresholds, the weight of the averaged SNIR is set to 0.25 at block 36a and the weight of the FEC indicator is set to 0.75 at block 36b, so that the most reliable information has more weight in the final PHY mode decision.

Regardless of the direction of change of the SNIR, if the SNIR rate of change is below the standard threshold, the weight of the averaged SNIR is set to 0 at block 36a and the weight of the FEC indicator is set to 1 at block 36b, so that the most reliable information is used in the final PHY mode decision.

It has been shown that the invention achieves the intended aim and objects. In particular, it is possible to give the adaptive modulation system a quick response to sudden weather changes, because detection occurs a number of functional blocks before the last MAC block of the receiver, where the final BER is, instead, measured according to the prior art.

First error information such as the SNIR can be compared with thresholds corresponding to the prior art modulation shift levels, but without taking into account the additional shift margin of the prior art.

Moreover, the combination of error information before and after symbol demapping can be performed regardless of the type of FEC being applied.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility

The invention claimed is:

1. A method for an adaptive modulation communication system, comprising:
receiving, over a communication channel, data encoded with a forward error correction (FEC) code;
measuring first error information of said encoded data that is available before FEC decoding of said received encoded data;
measuring second error information that is made available by said FEC decoding of said encoded data; and
controlling transmission over said communication channel based on both said first error information and said second error information by providing a weighted combination of the first error information and the second error information for determining a transmission mode over said communication channel, wherein weights of the weighted combination depend on a rate of variation of a communication channel condition, and wherein a greater weight is given to said first error information than to said second error information in case the variation of the communication channel condition is faster than a predefined rate.

2. The method of claim 1, wherein said FEC decoding of said encoded data is preceded by demodulating a modulated data signal received over the communication channel, wherein said FEC decoding consists in subsequently applying the FEC to the demodulated data signal, the first error information being the error information of the encoded data available before said demodulating.

3. The method of claim 2, wherein the modulated data signal is a Quadrature Amplitude Modulation (QAM) data signal and said demodulating comprises QAM demapping symbols contained in the modulated data signal.

4. The method of claim 1, wherein the first error information is a mean squared error level of the received encoded data.

5. The method of claim 2, wherein the first error information is an estimate of a signal-to-noise plus interference ratio (SNIR) of the encoded data before said demodulating.

6. The method of claim 1, wherein the second error information comprises a temporal average of a number of errors detected during said FEC decoding.

7. The method of claim 6, wherein the temporal average is calculated over an integration time, wherein the integration time is less than the duration of a radio frame in said communication channel.

8. The method of claim 1, further comprising the step of using said first error information for detecting variations of the communication channel condition faster than a predefined rate.

9. The method of claim 1, wherein the first error information is compared with thresholds corresponding to modulation shift levels.

10. The method of claim 1, wherein the FEC decoding includes single parity check (SPC) decoding and Reed-Solomon decoding, the second error information being the number of block errors detected by the SPC decoding.

11. The method of claim 3, wherein measuring the first error information comprises integrating a SNIR value over one radio frame and comparing its rate of change against a set of two thresholds, which includes a higher threshold being defined as a fast reaction threshold and a lower threshold being defined as a standard threshold, the method further comprising integrating a number of errors detected by SPC decoding over a period of half the radio frame, and wherein if the SNIR is decreasing and its rate of change exceeds the fast reaction threshold, the weight of the SNIR value is set to 1 and the weight of the detected errors from SPC decoding is set to 0; and wherein if the SNIR is decreasing and its rate of change is below the fast reaction threshold, the weight of the SNIR value is set to 0.5 and the weight of the detected errors from SPC decoding is set to 0.5; and wherein if the SNIR rate of change is below the standard threshold, the weight of the SNIR value is set to 0 and the weight of the detected errors from SPC decoding is set to 1.

12. The method of claim 3, wherein measuring the first error information comprises integrating a SNIR value over one radio frame and comparing its rate of change against a set of two thresholds, which includes a higher threshold being defined as a fast reaction threshold and a lower threshold being defined as a standard threshold, the method further comprising integrating a number of errors detected by SPC decoding over a period of half the radio frame, and wherein if the SNIR is decreasing and its rate of change and the detected errors rate of change exceed the fast reaction threshold, the weight of the SNIR value is set to 0.75 and the weight of the detected errors from SPC decoding is set to 0.25; and wherein if the SNIR is decreasing and its rate of change is below the fast reaction threshold and the detected errors rate of change exceeds the fast reaction threshold, the weight of the SNIR value is set to 0 and the weight of the detected errors average is set to 1; and wherein, regardless of the direction of change of the SNIR, if both the SNIR rate of change and the detected errors rate of change are between the standard and fast reaction thresholds, the weight of the SNIR is set to 0.25 and the weight of the detected errors average is set to 0.75; and wherein, regardless of the direction of change of the SNIR, if the SNIR rate of change is below the standard threshold, the weight of the SNIR is set to 0 and the weight of the detected errors average is set to 1.

13. The method of claim 1, wherein the FEC decoding includes Low Density Parity Check iterative decoding.

14. The method of claim 13, wherein the second error information is the number of failed parity checks at the first decoding iteration.

15. The method of claim 13, wherein the second error information is the number of failed parity checks at a decoding iteration different from the first iteration.

16. The method of claim 3, wherein measuring the first error information comprises integrating a SNIR value over one radio frame and comparing its rate of change against a set of two thresholds, which includes a higher threshold being defined as a fast reaction threshold and a lower threshold being defined as a standard threshold, and the number of failed parity checks computed at the first decoding iteration is averaged over a number of LDPC blocks corresponding to a period of half the radio frame, wherein if the SNIR is decreasing and its rate of change exceeds the fast reaction threshold, the weight of the SNIR value is set to 1 and the weight of the averaged number of failed parity checks is set to 0; and wherein if the SNIR is decreasing and its rate of change is below the fast reaction threshold and the rate of change of the averaged number of failed parity checks exceeds the fast reaction threshold, the weight of the averaged SNIR value is set to 0 and the weight of the averaged number of failed parity checks is set to 1; and wherein, regardless of the direction of change of the SNIR, if both the SNIR rate of change and the rate of change of the averaged number of failed parity checks are between the standard and fast reaction thresholds, the weight of the SNIR is set to 0.25 and the weight of the averaged number of failed parity checks is set to 0.75; and wherein, regardless of the direction of change of the SNIR, if the SNIR rate of change is below the standard threshold, the weight of the SNIR is set to 0 and the weight of the averaged number of failed parity checks is set to 1.

17. The method of claim 3, wherein measuring the first error information comprises integrating the SNIR value over one radio frame and comparing its rate of change against a set of two thresholds, which includes a higher threshold being defined as a fast reaction threshold and a lower threshold being defined as a standard threshold, and the number of failed parity checks computed at said decoding iteration different from the first one is averaged over a number of LDPC blocks corresponding to a period of half the radio frame, wherein if the SNIR is decreasing and both its rate of change and the rate of change of the averaged number of failed parity checks exceed the fast reaction threshold, the weight of the SNIR value is set to 0.50 and the weight of the averaged number of failed parity checks is set to 0.50; and wherein if the SNIR is decreasing and its rate of change is below the fast reaction threshold and the rate of change of the averaged number of failed parity checks exceeds the fast reaction threshold, the weight of the averaged SNIR value is set to 0 and the weight of the averaged number of failed parity checks is set to 1; and wherein, regardless of the direction of change of the SNIR, if both the SNIR rate of change and the rate of change of the averaged number of failed parity checks are between the standard and fast reaction thresholds, the weight of the SNIR is set to 0.25 and the weight of the averaged number of failed parity checks is set to 0.75; and wherein, regardless of the direction of change of the SNIR, if the SNIR rate of change is below the standard threshold, the weight of the SNIR is set to 0 and the weight of the averaged number of failed parity checks is set to 1.

18. A device for an adaptive modulation communication system, comprising:
an input device adapted to receive, from a communication channel, data encoded with a forward error correction (FEC) code;
a FEC decoder connected downstream of the input device, for FEC decoding the received encoded data and providing error information determined by the FEC decoding;
one or more measuring devices configured to:
measure first error information of said encoded data before FEC decoding said received encoded data;
measure second error information determined by said FEC decoder;
a channel estimator configured to estimate a condition of the communication channel based on both said first error information and said second error information by providing a weighted combination of the first error information and the second error information for determining a transmission mode over said communication channel, wherein weights of the weighted combination depend on a rate of variation of a communication channel condition, and wherein a greater weight is given to said first error information than to said second error information in case the variation of the communication channel condition is faster than a predefined rate.

19. The device of claim 18, further comprising a demodulator connected between the input device and the FEC decoder, the one or more measuring devices being adapted to measure the first error information of the encoded data between the demodulator and the input device.

20. The device of claim 19, wherein the demodulator is a Quadrature Amplitude Modulation demodulator.

21. The device of claim 18, wherein the first error information is a Mean Squared Error level of the received encoded data.

22. The device of claim 21, wherein the first error information is an estimate of a signal-to-noise plus interference ratio, SNIR, of the encoded data upstream of said demodulator.

23. The device of claim 18, wherein the second error information comprises a temporal average of a number of errors detected by said FEC decoder during said FEC decoding.

24. The device of claim 23, wherein the temporal average is calculated over an integration time which is less than the duration of a radio frame in said communication channel.

25. The device of claim 20, wherein measuring the first error information comprises integrating a SNIR value over one radio frame and comparing its rate of change against a set of two thresholds, which includes a higher threshold being defined as a fast reaction threshold and a lower threshold being defined as a standard threshold, the method further comprising integrating a number of errors detected by SPC decoding over a period of half the radio frame, and wherein if the SNIR is decreasing and its rate of change exceeds the fast reaction threshold, the weight of the SNIR value is set to 1 and the weight of the detected errors from SPC decoding is set to 0; and wherein if the SNIR is decreasing and its rate of change is below the fast reaction threshold, the weight of the SNIR value is set to 0.5 and the weight of the detected errors from SPC decoding is set to 0.5; and wherein if the SNIR rate of change is below the standard threshold, the weight of the SNIR value is set to 0 and the weight of the detected errors from SPC decoding is set to 1.

26. The device of claim 22, wherein measuring the first error information comprises integrating SNIR value over one radio frame and comparing its rate of change against a set of two thresholds, which includes a higher threshold being defined as a fast reaction threshold and a lower threshold being defined as a standard threshold, the method further comprising integrating a number of errors detected by SPC decoding over a period of half the radio frame, and wherein if the SNIR is decreasing and its rate of change and the detected errors rate of change exceed the fast reaction threshold, the weight of the SNIR value is set to 0.75 and the weight of the detected errors from SPC decoding is set to 0.25; and wherein if the SNIR is decreasing and its rate of change is below the fast reaction threshold and the detected errors rate of change exceeds the fast reaction threshold, the weight of the SNIR value is set to 0 and the weight of the detected errors average is set to 1; and wherein, regardless of the direction of change of the SNIR, if both the SNIR rate of change and the detected errors rate of change are between the standard and fast reaction thresholds, the weight of the SNIR is set to 0.25 and the weight of the detected errors average is set to 0.75; and wherein, regardless of the direction of change of the SNIR, if the SNIR rate of change is below the standard threshold, the weight of the SNIR is set to 0 and the weight of the detected errors average is set to 1.

27. The device of claim 18, wherein the channel estimator is adapted to compare the first error information with thresholds corresponding to modulation shift levels.

28. The device of claim 18, wherein the FEC decoder includes a Single Parity Check decoder and Reed-Solomon decoder, the second error information being the number of block errors detected by the Single Parity Check decoder.

29. The device of claim 18, wherein the FEC decoder includes a Low Density Parity Check iterative decoder.

30. The device of claim 29, wherein the second error information is the number of failed parity checks at the first decoding iteration.

31. The device of claim 29, wherein the second error information is the number of failed parity checks at a decoding iteration different from the first decoding iteration.

32. The device of claim 20, wherein measuring the first error information comprises integrating a SNIR value over one radio frame and comparing its rate of change against a set of two thresholds, which includes a higher threshold being defined as a fast reaction threshold and a lower threshold being defined as a standard threshold, and the number of failed parity checks computed at the first decoding iteration is averaged over a number of LDPC blocks corresponding to a period of half the radio frame, wherein if the SNIR is decreasing and its rate of change exceeds the fast reaction threshold, the weight of the SNIR value is set to 1 and the weight of the averaged number of failed parity checks is set to 0; and wherein if the SNIR is decreasing and its rate of change is below the fast reaction threshold and the rate of change of the averaged number of failed parity checks exceeds the fast reaction threshold, the weight of the averaged SNIR value is set to 0 and the weight of the averaged number of failed parity checks is set to 1; and wherein, regardless of the direction of change of the SNIR, if both the SNIR rate of change and the rate of change of the averaged number of failed parity checks are between the standard and fast reaction thresholds, the weight of the SNIR is set to 0.25 and the weight of the averaged number of failed parity checks is set to 0.75; and wherein, regardless of the direction of change of the SNIR, if the SNIR rate of change is below the standard threshold, the weight of the SNIR is set to 0 and the weight of the averaged number of failed parity checks is set to 1.

33. The device of claim 20, wherein measuring the first error information comprises integrating a SNIR value over one radio frame and comparing its rate of change against a set of two thresholds, which includes a higher threshold being defined as a fast reaction threshold and a lower threshold being defined as a standard threshold, and the number of failed parity checks computed at said decoding iteration different from the first one is averaged over a number of LDPC blocks corresponding to a period of half the radio frame, wherein if the SNIR is decreasing and both its rate of change and the rate of change of the averaged number of failed parity checks exceed the fast reaction threshold, the weight of the SNIR value is set to 0.50 and the weight of the averaged number of failed parity checks is set to 0.50; and wherein if the SNIR is decreasing and its rate of change is below the fast reaction threshold and the rate of change of the averaged number of failed parity checks exceeds the fast reaction threshold, the weight of the averaged SNIR value is set to 0 and the weight of the averaged number of failed parity checks is set to 1; and wherein, regardless of the direction of change of the SNIR, if both the SNIR rate of change and the rate of change of the averaged number of failed parity checks are between the standard and fast reaction thresholds, the weight of the SNIR is set to 0.25 and the weight of the averaged number of failed parity checks is set to 0.75; and wherein, regardless of the direction of change of the SNIR, if the SNIR rate of change is below the standard threshold, the weight of the SNIR is set to 0 and the weight of the averaged number of failed parity checks is set to 1.

34. An adaptive modulation communication system, comprising a transmitter stage for transmitting over a communication channel data encoded through a Forward Error Correction code, said encoded data being modulated according to the communication channel conditions, wherein the system comprises a receiver stage according to the device of claim 18.

* * * * *

UNITED STATES PATENT AND TRADEMARK OFFICE
CERTIFICATE OF CORRECTION

| | | |
|---|---|---|
| PATENT NO. | : 8,972,825 B2 | Page 1 of 1 |
| APPLICATION NO. | : 13/260614 | |
| DATED | : March 3, 2015 | |
| INVENTOR(S) | : Chinnici et al. | |

It is certified that error appears in the above-identified patent and that said Letters Patent is hereby corrected as shown below:

In the specification

In Column 1, Line 33, delete "data hits" and insert -- data bits --, therefor.

In Column 1, Line 65, delete "heavy rainy," and insert -- heavy rain, --, therefor.

In Column 6, Line 41, delete "section 21h." and insert -- section 21b. --, therefor.

In Column 7, Line 5, delete "34a and 34h." and insert -- 34a and 34b. --, therefor.

In Column 7, Line 20, delete "39a and 39h" and insert -- 39a and 39b --, therefor.

In Column 9, Line 53, delete "block 36h," and insert -- block 36b, --, therefor.

Signed and Sealed this
Twenty-third Day of February, 2016

Michelle K. Lee
*Director of the United States Patent and Trademark Office*